UNITED STATES PATENT OFFICE.

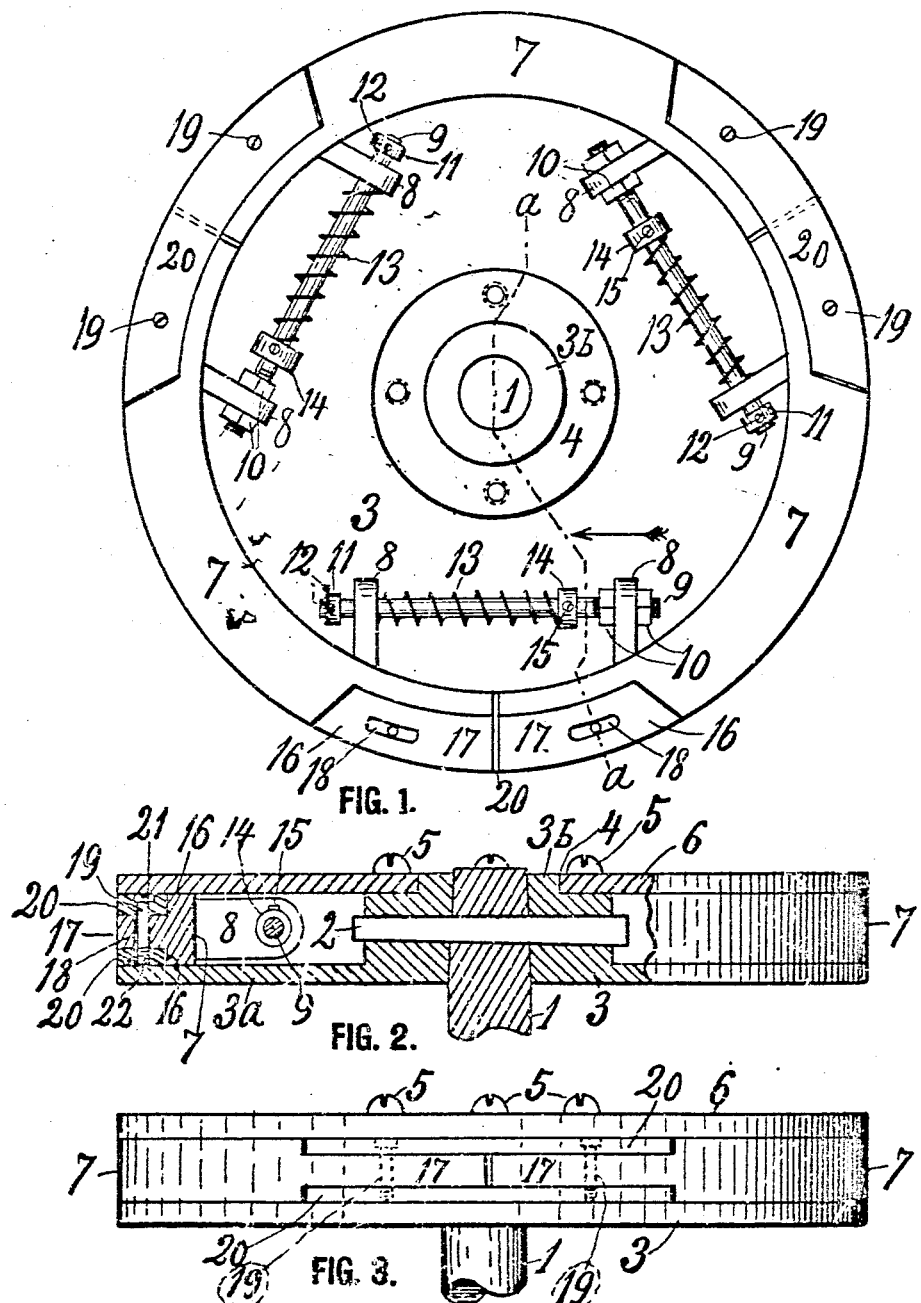

JUSTEN STODDARD, OF STILLWATER, MINNESOTA.

PISTON-RING.

962,599.

Specification of Letters Patent. Patented June 28, 1910.

Application filed January 13, 1910. Serial No. 537,824.

*To all whom it may concern:*

Be it known that I, JUSTEN STODDARD, a citizen of the United States, residing at Stillwater, in the county of Washington and State of Minnesota, have invented a new and useful Piston-Ring, of which the following is a specification.

My invention relates to piston rings for reciprocating pistons of steam engines; and the object is to provide a piston ring that will automatically expand against the sides of the steam cylinder in an efficient manner and still only with the necessary friction to the parts.

In the accompanying drawing:—Figure 1 is a rear side elevation of a piston provided with my improved ring, the follow-plate of the piston and one of the lap-plates of the ring are removed to give a better view of the ring. Fig. 2 is a section on the line $a$—$a$ in Fig. 1 of the complete piston and its ring and a portion of a piston rod secured therein. Fig. 3 is an edge view of the complete piston and ring put together and a portion of a piston rod in it.

Referring to the drawing by reference numerals, 1 designates a piston rod on which is secured by a key 2 the piston head 3. The latter is formed with the usual body flange 3ᵃ and central hub 3ᵇ, having a recess 4, in which is secured by cap screws or bolts 5 the follow-plate 6 of the piston. Between the plate 6 and the inner face of the piston head is snugly yet movably fitted the packing ring, which is composed of three segmental sections 7, the ends of which come normally almost together and are each provided with an inward-directed arm 8 having a hole through it for a bolt 9, which has one end firmly held in one of the arms by jam nuts 10, the other end of the bolt slides in the hole of the arm 8 of the next ring section in which it is retained by a collar 11 secured by a set screw 12. Upon said bar is placed a coil spring 13, which is partly compressed between the arm 8 in which the bolt or rod slides and a collar 14 adjustably held by a set screw 15 on the rod.

The adjacent ends of the ring sections are some distances from their inner curve to their outer periphery formed with segmental recesses 16, which reduce the end to a web 17 (see to the left in Fig. 2); each web is provided with a slot 18, through which is loosely passed a screw 19, whose head 21 and threaded end 22 hold the segmental lap-plates 20 in the recesses 16.

In the use of the piston with this improved ring in it, when the piston is in a cylinder, the lap-plates 20 prevent escape of steam from one side of the piston to the other between the abutting ends of the ring section, and the springs 13 expand the ring sections and by them the lap-plates against the sides of the cylinder. The exact tension desired or needed is regulated by adjustment of the collars 14 to and from the spring 13.

What I claim is:

1. In combination with a two-part piston for reciprocating engines, a packing ring fitting between the two members of the piston and composed of a series of segmental ring sections butting against each other with their ends, said ends having each an inwardly directed arm, a rod secured in one of said arms and sliding with its other end in the adjacent arm of the next ring section, a compressed coil spring encircling the rod, and means on the rod for compressing the spring more or less against the arm in which the rod slides, said sections having their ends recessed upon the sides facing the members of the piston, and slots through the portion reduced in thickness by the recesses, segmental lap-plates in the recesses and means securing the lap-plates together, said means passing through said slots.

2. In combination with a two-part piston for reciprocating engines, a packing ring fitting between the two members of the piston and composed of a series of segmental ring sections butting against each other with their ends, said ends having each an inwardly directed arm, a rod secured in one of said arms and sliding with its other end in the adjacent arm of the next ring section, a compressed coil spring encircling the rod, and means on the rod for compressing the spring more or less against the arm in which the rod slides, said sections having their ends recessed upon the sides facing the members of the piston; lap-plates in said recesses and means for holding the plates in the recesses, the ends of the ring sections having longitudinal play between the lap-plates.

3. In combination with a two-part piston for reciprocating engines, a packing ring fitting between the two members of the piston and composed of a series of segmental ring sections butting against each other with their ends, said ends having each an inwardly directed arm, a rod secured in one of said arms and sliding with its other end in the adjacent arm of the next ring section, a compressed coil spring encircling the rod, and means on the rod for compressing the spring more or less against the arm in which the rod slides, said sections having their ends recessed upon the sides facing the members of the piston; lap-plates in said recesses and means for holding the plates in the recesses, the ends of the ring sections having longitudinal play between the lap-plates; and means on the sliding end of the rod to prevent its accidental separation from the arm it slides in.

In testimony whereof I affix my signature, in presence of two witnesses.

JUSTEN STODDARD.

Witnesses:
L. W. BURCHARD,
CARL MUNSON.